Figure 1:
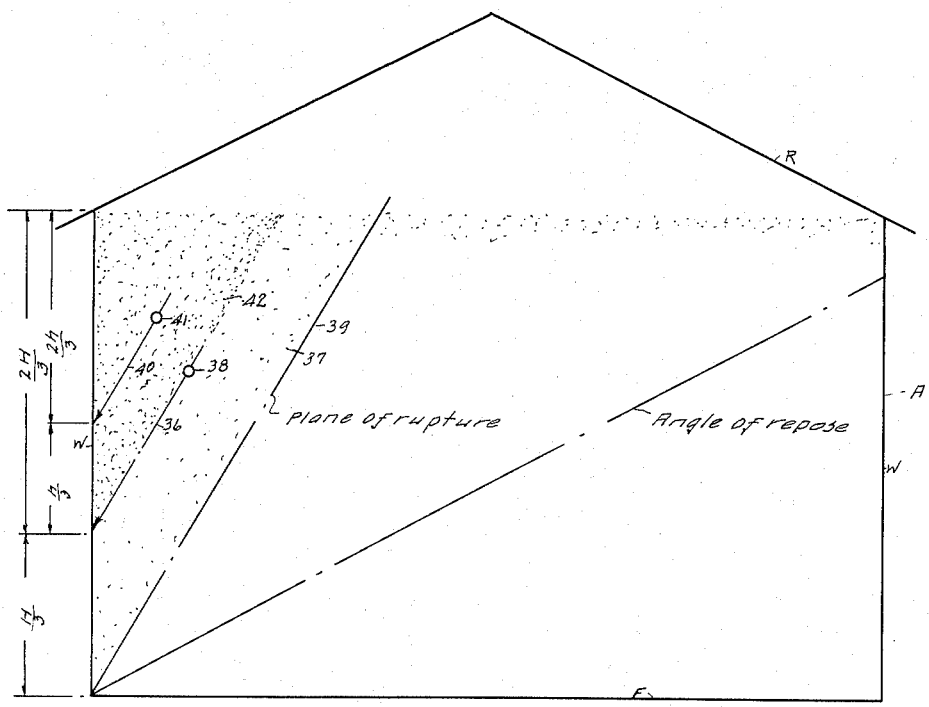

Nov. 22, 1955 E. G. STACK 2,724,151
GRAIN BINS AND THE LIKE
Filed Nov. 22, 1950 4 Sheets-Sheet 1

Emmet G. Stack
Inventor

Nov. 22, 1955                E. G. STACK                2,724,151
                        GRAIN BINS AND THE LIKE
Filed Nov. 22, 1950                                4 Sheets-Sheet 2

Emmet G. Stack
Inventor

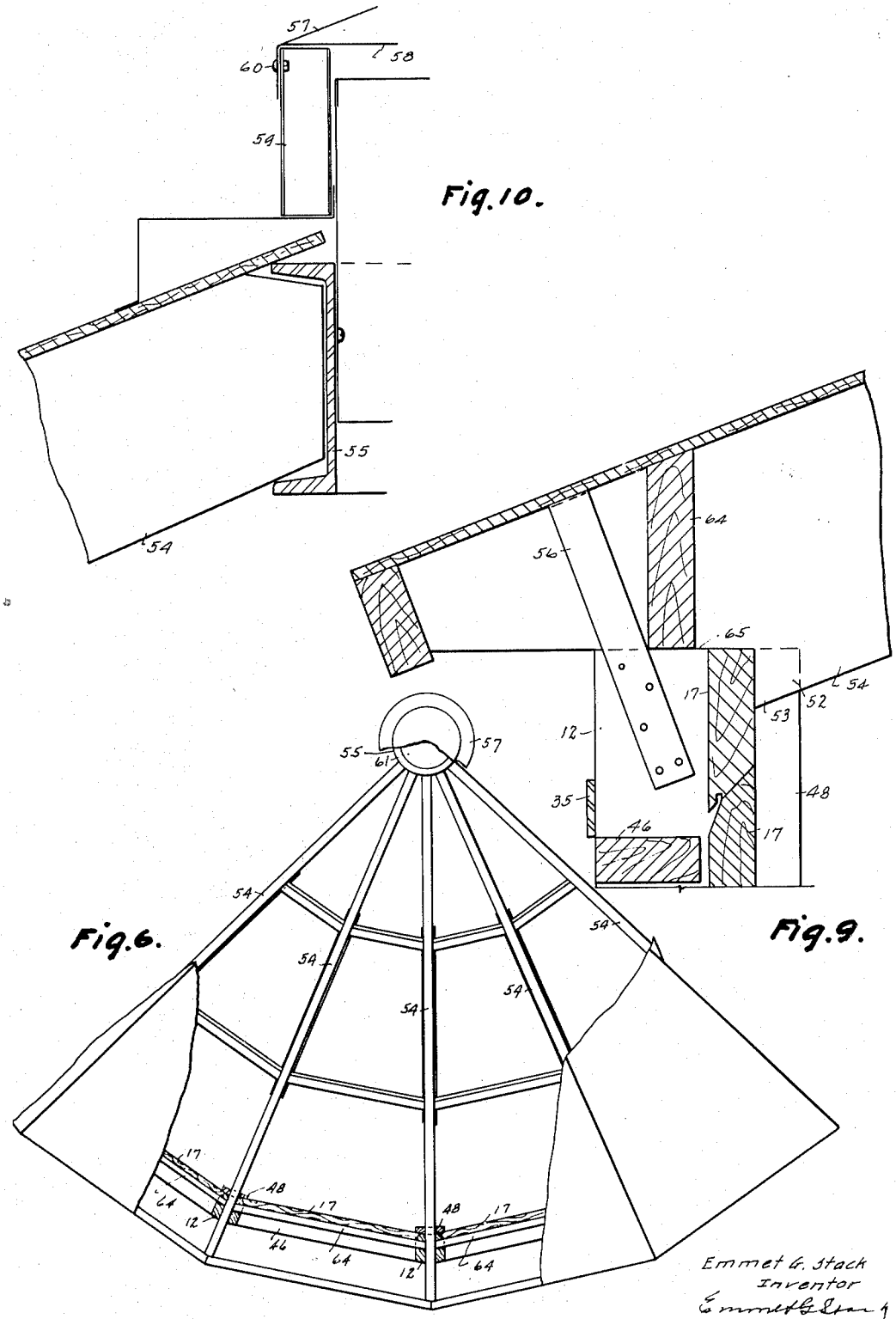

Nov. 22, 1955 E. G. STACK 2,724,151
GRAIN BINS AND THE LIKE
Filed Nov. 22, 1950 4 Sheets-Sheet 4

Emmet G. Stack
Inventor

United States Patent Office 2,724,151
Patented Nov. 22, 1955

2,724,151
GRAIN BINS AND THE LIKE
Emmet G. Stack, Portland, Oreg.
Application November 22, 1950, Serial No. 197,062
3 Claims. (Cl. 20—1.2)

This application is a continuation-in-part of my application for Grain Bins and the Like, filed February 16, 1949, Ser. No. 76,683, now abandoned.

My invention relates particularly to a structure adapted to confine material which acts as a semi-fluid, such as wheat. Such articles as wheat, oats, barley, rye, and shell corn, create pressures in a tank different than water. Water, when poured into a tank, spreads out and seeks its level, whereas wheat, for instance, continues to build up into a cone until the sides of the cone form an angle with the floor of approximately 28 degrees which is known as the angle of repose. The pressure of the water against the tank sides varies as the depth, and the entire weight of the water in the tank is carried by the floor. As the depth of the wheat in a bin is increased part of its weight is transferred to the bin sides due to friction between the individual grains and the friction of the grain in contact with the bin sides. This friction continues to increase until, in bins having a height several times the bin diameter, as much as 80% of the grain in the bin is carried by the bin sides. In shallow bins the pressure on the side walls is due to the wedge of grain which lies between the bin side and the plane of rupture which is midway between the bin side and the angle of repose. A shallow bin is classed as one in which the plane of rupture cuts the surface of the grain within the bin, or in other words passes out of the grain before it meets the opposite side of the bin. The total pressure against the bin side walls of this wedge-shaped mass of grain multiplied by the co-efficient of friction of the grain against the side walls gives the vertical sustaining force of the side wall friction. This amount subtracted from the total weight of the grain in the bin gives the weight of the grain carried by the floor. It is apparent from the above that the maximum pressure of the wedge-shaped mass of grain against the side wall will be at the floor line and the center of gravity of the wedge-shaped mass of grain will be located a distance $2h/3$ above the floor. The total lateral pressure against the bin sides may be considered as acting thru the center of gravity of the wedge-shaped mass of grain parallel to the plane of rupture. It will be further apparent that this total lateral pressure in shallow bins will be the same in bins of like depth regardless of their diameter. However, the bursting pressure exerted will vary as the diameters. As a consequence, it is possible to use the same bin members for a forty foot bin as for a ten foot bin by merely increasing the restraining means against bursting.

The above facts permit short lengths of lumber to be used in the bin construction now to be minutely described. These short lengths may be cut from the lower grades of lumber which are a drug on the market even in these days of high prices. To be able to use such material in grain bins is one of the principal objectives of my invention. Others will appear as I proceed with the description of my bin which is illustrated in the accompanying drawings.

Figure 4:
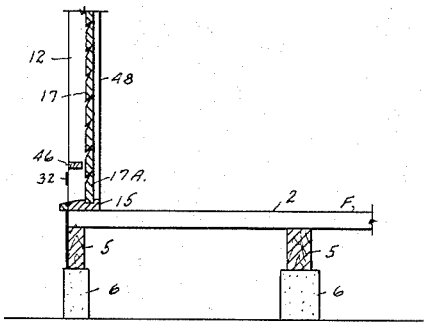
Figure 5:
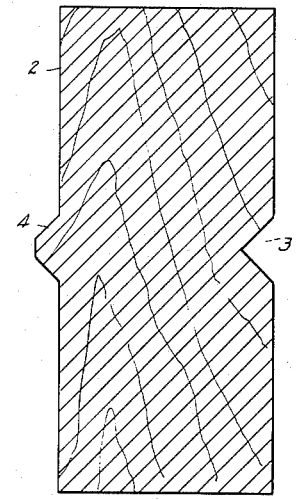
Figure 3:
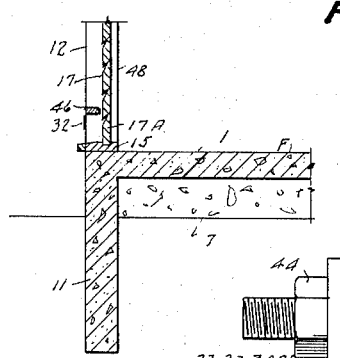
Figure 13:
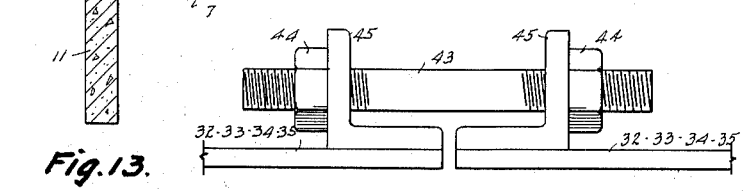
Figure 2:
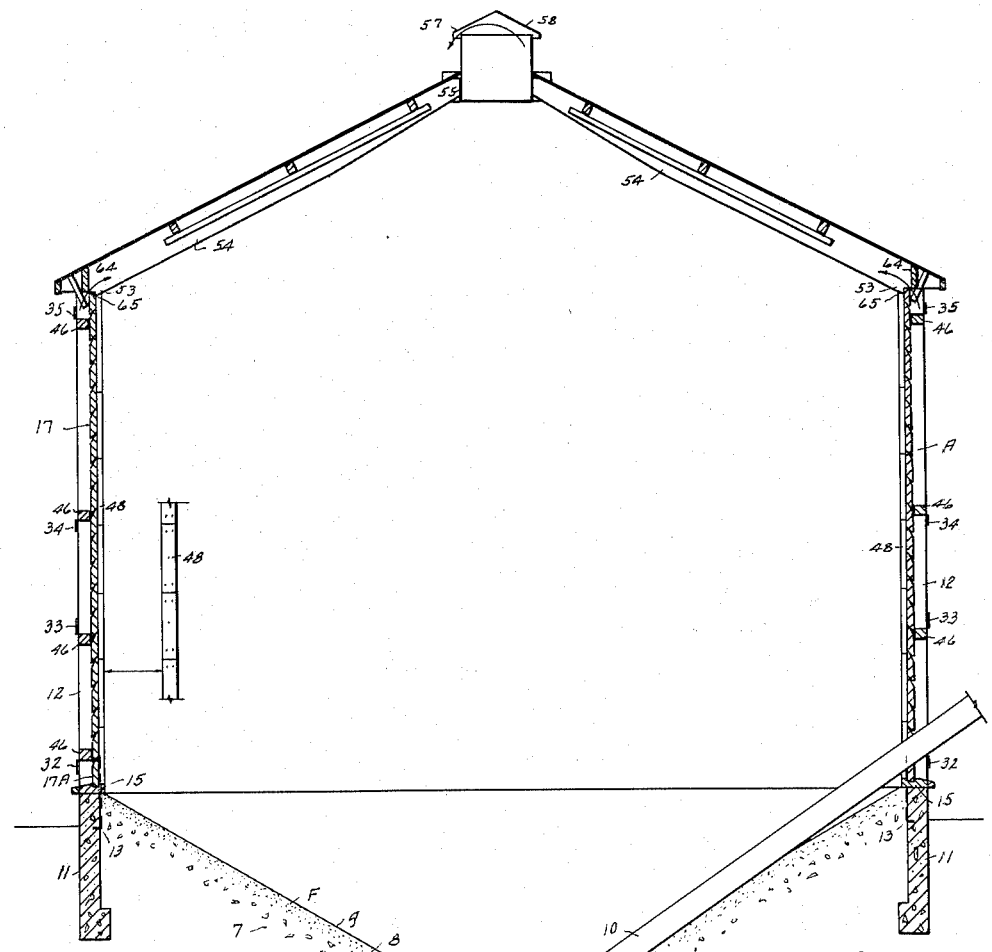
Figure 11:
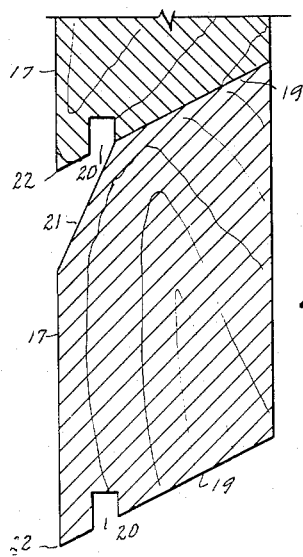
Figure 12:
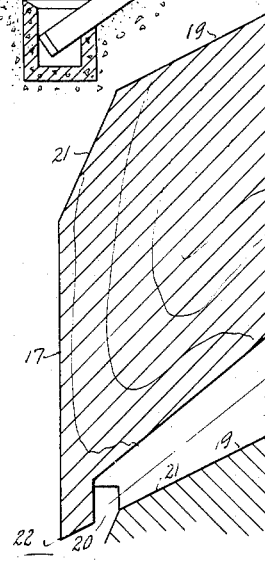
Figure 8:
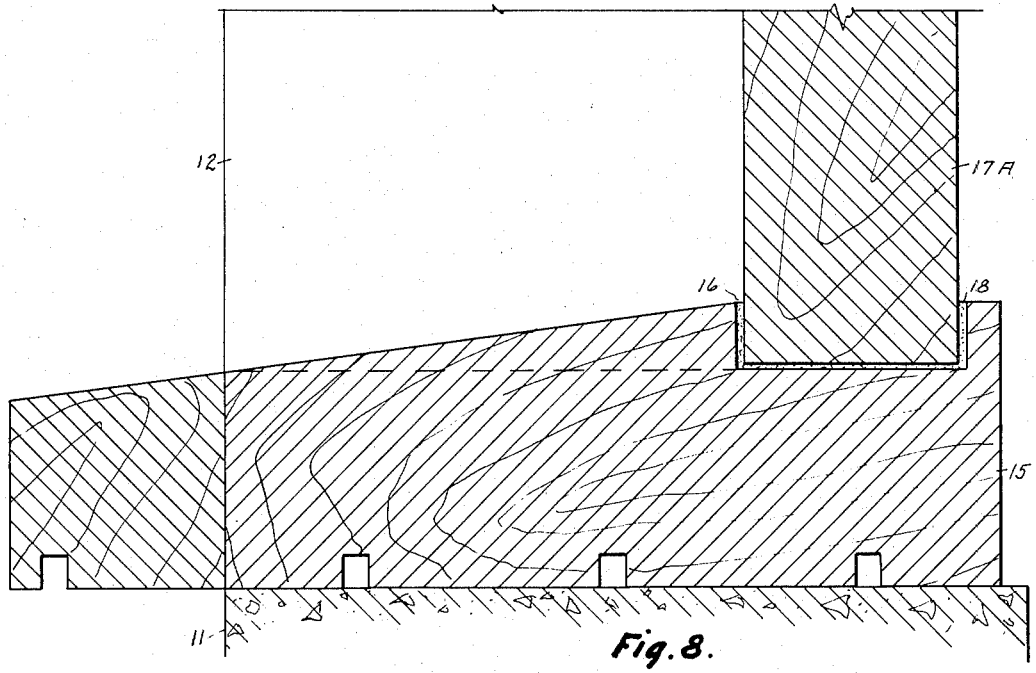
Figure 7:
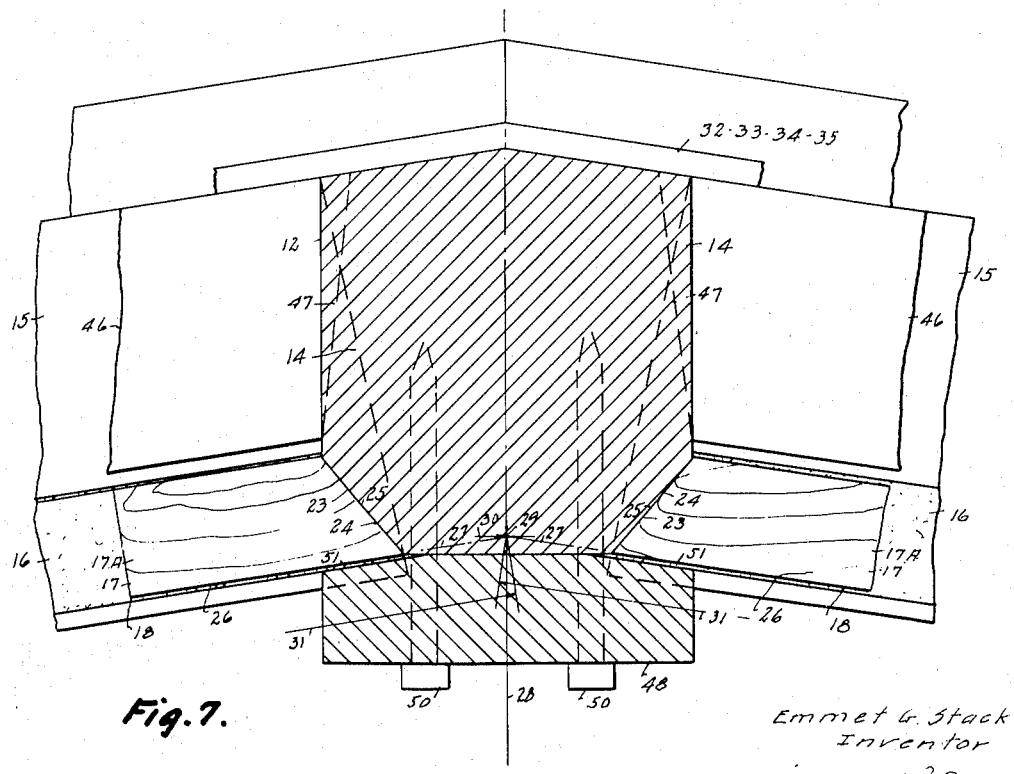

Fig. 1 of the drawings is a diagrammatic vertical section of a bin showing the action of the grain against the grain bin members; Fig. 2 is a vertical section thru a bin having a dished floor; Fig. 3 is a partial vertical section showing a flat concrete floor; Fig. 4 is a partial vertical section showing a flat crib floor; Fig. 5 is a section thru a crib floor member; Fig. 6 is a partial plan view of the roof; Fig. 7 is an enlarged horizontal section thru a standard; Fig. 8 is an enlarged vertical section thru the sill shown in Fig. 2; Fig. 9 is an enlarged vertical section thru the eaves shown in Fig. 2; Fig. 10 is an enlarged vertical section thru the lantern shown in Fig. 2; Fig. 11 is a vertical section thru a side member; Fig. 12 is a vertical section thru a side member milled to provide ventilation; Fig. 13 is a partial side elevation of a restraining member.

Thruout the drawings and the specification similar numerals refer to similar parts.

The diagrammatic outline of the bin A in Fig. 1, shows the relation of the bin parts and how they are loaded by the grain within the bin.

Fig. 3 shows a flat slab of concrete 1 used as the bin floor, while Fig. 4 shows a wood crib floor. A detail of a crib floor member is shown in Fig. 5. This member 2 is usually run from 2 x 4's or 2 x 6's with a cone-shaped groove 3 on one side face and a frustum-shaped tongue 4 on the opposite face.

Where wood crib floors are used ventilation is required under them hence the sills 5 which support the crib floor members 2 are usually set on blocking or concrete piers 6.

If a concrete slab 1 is used which rests upon the ground at least a six inch bed of gravel 7 should intervene so that moisture from the ground cannot reach the bin contents.

The bin shown in Fig. 2 is provided with a floor F which rests upon a gravel bed 7. This floor F may be of concrete or consist of a bitumel sub-base 8 with a topping 9 such as "Laycold." This last mentioned construction is usually the cheaper and is impervious to moisture. It is to be noted that this floor F is dished out or concavely formed with a slope slightly greater than the angle of repose of the grain stored. There are two principal advantages in the dished floor. First, a greatly increased storage capacity is had at a minimum cost. Second, the grain in the bin has a tendency to flow to the center of the bin where it may be gathered into a screw conveyor as 10 for removal.

Fig. 2 shows a concrete ring wall 11 providing the support for a plurality of spaced vertical timber standards 12 anchored to the ring wall by the irons 13. The bottom of the standards 12 are dadoed to the line 14 to receive the ends of the plate 15 cut in between adjacent standards 12. The plates 15 are secured to the ring wall 11 in any suitable manner or to the concrete or crib floors should they be sitting on them as shown in Figs. 3 and 4. The plates 15 when in place position the standards and prevent forward or side movement. The plates 15 are each provided with a groove 16 for the reception of the bottom member 17A of the bin sides members 17. The groove 16 is made wider than the thickness of the bin side member 17A so that it may be imbedded in mastic 18 as a seal against moisture. This same mastic 18, or a substitute, should be used to bed the plates 15 in and to set the standards on. The bin side members are made up of a bottom member 17A and a plurality of quite similar upper members 17 arranged in stacked relation. These side members are run from 2 x 4's or 2 x 6's with the contacting edge surfaces run to a pitch of approximately 6" to 1'. The bottom contacting surface 19 is provided with a drip groove 20 and the top contacting surface 21 is relieved back of the drip groove 20 so that any water may be held to the drip end 22 until it drops off. The ends 23 of the bin sides members 17 and 17A are cut on a bevel with the inside end the longest and are of a length to permit them to bear against the chamfer 24 formed on the inner corners 25 of the standards 12. If the inner face 26 of the bin sides members 17 and 17A were extended as shown by the broken lines 27 to intersect a radial line 28 passing thru the center of a standard 12 the point of intersection 29 would be on the same circle, indicated in part by the numeral 30, which I desire to make of a size to divide into a number of spaces having chords 31 4'-0" long. From a perusal of Fig. 7, it is evident that the bin sides members 17 and 17A are less than 4'-0" long. I find that such a length in 2" stock of West Coast fir or hemlock will suffice for pressures encountered. It is evident that these same 2 x 4's may be laid flat instead of vertical. Pieces of adequate strength and quality in this short length may be cut between defects in low grade stock without too much waste. I find that this same low grade lumber yields cuttings that will make a crib floor of adequate strength since a close spacing of sills and piers is indicated for the heavy floor loads encountered in shallow bins from 15' to 40' in diameter. The close spacing of the sills 5 permits joints to be made in the crib floor between sills if joints between adjacent floor members are well broken. In this type of bin with crib floors about 75% of the members are six foot and under.

A bin may have any number of sides but whether it is a 12-side 20' bin with a capacity of 3200 bushels or a 32-side bin 20' high with a capacity of 22,000 bushels similar standards and side members could be used for both.

In this application the restraining members against bursting pressure are the bands 32, 33, 34, and 35, positioned as shown in Fig. 2. The standards 12 may first be considered as simple beams receiving the concentrated lateral pressure at a point H/3 of their length above the floor F or the point where the line of concentrated pressure 36 of the wedge-shape mass of grain 37 passing thru its center of gravity 38 parallel to the plane of rupture 39 cuts the bin side walls W. The reactions from this concentrated load on the standards 12 are taken by the bands 32 and 35, the latter taking the thrust from the roof R too. Rather than make the standards too large I prefer to use a band 33 positioned H/3 above the floor F thus making the standards 12 continuous beams. The band 34 is placed h/3 above the band 33 or the point where the line of concentrated pressure 40 passing thru the center of gravity 41 of the smaller wedge-shape mass of grain 42 parallel to the plane of rupture 39 cuts the bin side walls W. The bands 32, 33, 34, and 35, are made in sections whose ends are held together by a threaded rod 43 provided with a nut 44 on each end thereof which bear against the back of the angle clips 45 welded to the band ends as shown in Fig. 13.

Adjacent to each of the bands 32, 33, 34, and 35, is a girt 46 set in a dadoe cut to the line 47 in the standards 12. As a consequence, since the bins are polygonal in shape they are not readily distorted from outside forces regardless of the direction of their application.

The side wall members 17, when the bin is empty, are held in place by the sides keeper 48. This member in conjunction with the chamfer 24 on the standards 12 forms a groove or pocket 49 for the reception of the beveled ends 23 of the side members 17 which bear tight against the chamfer 24 when the bin is full and tight against each other edgewise since the side members 17 carry much of the weight of the grain in the bin. It is apparent from a perusal of the drawings that the pressure against the side members 17 is constantly crowding them downwardly and outwardly. To facilitate the erection of the bin or to change the bin from a grain bin to a corn crib or vice versa I prefer to make the sides keeper 48 in about 4' lengths and secure them to the standards 12 by lag screws 50. A side member 17 can then be put in place without dropping it from the top of the standard 12 as would be necessary if the groove 49 were milled in the standards 12. The side of the keeper 48 is beveled to suit the particular bin but plenty to provide ample clearance so that the side members 17 can be readily raised or lowered. See Fig. 7, at the point 51.

The top section of the side keeper 48 is made only about 2' in length and is fastened permanently in place since its upper end is provided with a slot 52 for the reception of the end of the lower chord of a truss (not shown) or the heel 53 of the rafter 54. The heel 53 of the rafter 54 bears against the standard 12 and its upper end is supported by the channel lantern ring 55. Since the lantern ring 55 is at an elevation considerably above a rafter heel 53 the rafter 54 bridges itself because it is opposed by the rafter 54 opposite it. Its weight and the live load always act downwardly and the thrust therefrom is transferred from the rafter heel 53 to the standard 12 against which it bears and finally to the restraining band 35. Upward movement due to wind is taken by the strap stirrup 56 which straddles the rafter member 54 and the top end of the standard 12 to which it is nailed from both sides.

The lantern ring 55 supports a galvanized iron ventilator 57 whose top 58 is secured to body stiffening channels 59 by the screws 60 so that the top may be removed to use the space 61 for filling the bin. The usual scuttle holes and ladders usually a part of bin equipment have not been shown.

Bins for grain are made tight in order to hold articles of a semi-fluid nature of which shelled corn is one. When the corn is on the cob tightness of the sides is not necessary, in fact is detrimental, since it is very desirable to let air circulate up thru the corn to prevent heating. Fig. 12 shows how a bin side member 17 may be relieved between its ends 23 by a chamfer 62 which is formed to provide a flared air space 63 small at the bottom so that mice may not enter and large at the top to diffuse the entering air. I provide and position a header 64 within about an inch of the top side member 17 to provide a space for the ingress or egress of air without letting birds or insects into the bin. In most localities this space 65 does not have to be screened although it may.

It must be understood that the design of each grain bin is an engineering problem and the size and arrangement of parts may be varied and altered to meet the conditions encountered without departing from the basic idea covered in the appended claims.

I claim:

1. In a grain bin a side wall member of dimension lumber formed with a bevelled bottom edge provided with a drip groove and a top edge having a portion thereof bevelled parallel to the bottom edge and a second portion bevelled at a greater slope and merged with the first mentioned portion rearwardly of the drop groove in a side wall member stacked verticaly thereabove and ends oppositely bevelled to provide load-bearing surfaces of end wood facing outwardly with the long points of the bevelled ends being positioned on the interior or grain side of said side wall member.

2. In a grain bin in combination with a roof and a floor, side walls including a plurality of spaced vertical standards having a generally rectangular cross section excepting that they have chamfered inner corners, a keeper secured to the inner face of each standard having a generally rectangular cross section excepting that said keeper has a chamfered corner oppositely disposed to a standard chamfer forming therewith a pocket, a plurality of side wall members of dimension lumber arranged between adjacent standards in edgewise stacked relation with downwardly bevelled contacting faces therebetween and bevelled ends formed to match the chamfer bevel on the standards said ends being loosely confined within the pockets to permit said side wall members to move downwardly and outwardly to rest under vertical and lateral pressure from grain within the bin, and bursting pressure restraining means encircling the standards at predetermined points of pressure against the standards.

3. In a polygonal grain bin a side including two spaced vertical standards each having a generally rectangular cross section excepting that they have chamfered inner corners, a keeper secured to the inner face of each standard having a generally rectangular cross section excepting that said keeper has a chamfered corner oppositely disposed to a standard chamfer forming therewith a pocket, and a plurality of side wall members of dimension lumber arranged between the standards in edgewise stacked relation with downwardly bevelled contacting faces therebetween and bevelled ends formed to match the chamfer bevel on the standards each end being loosely confined within the adjacent pocket on adjacent standards.

References Cited in the file of this patent

UNITED STATES PATENTS

| | | | |
|---|---|---|---|
| 90,116 | Mills | May 18, | 1869 |
| 339,211 | Rabitz | Apr. 6, | 1886 |
| 735,485 | Farrell | Aug. 4, | 1903 |
| 858,841 | Walrath et al. | July 2, | 1907 |
| 976,951 | Van Cott | Nov. 29, | 1910 |
| 1,116,654 | Wenzelmann | Nov. 10, | 1914 |
| 1,167,354 | Crady | Jan. 4, | 1916 |
| 1,254,131 | Flynn | Jan. 22, | 1918 |
| 1,261,454 | Stafford | Apr. 2, | 1918 |
| 1,339,915 | Bishopric | May 11, | 1920 |
| 2,045,082 | Hegenes | June 23, | 1936 |
| 2,115,270 | Leash | Apr. 26, | 1938 |
| 2,505,902 | Madger | May 2, | 1950 |
| 2,563,703 | Bonney | Aug. 7, | 1951 |

FOREIGN PATENTS

| | | | |
|---|---|---|---|
| 453,381 | Germany | Dec. 7, | 1927 |